United States Patent
Wu et al.

(10) Patent No.: US 8,288,027 B2
(45) Date of Patent: Oct. 16, 2012

(54) ELECTRONIC DEVICE HAVING BATTERY HOLDER

(75) Inventors: Wei Wu, Shenzhen (CN); Xin Yang, Shenzhen (CN)

(73) Assignees: Hong Fu Jin Precision Industry (ShenZhen) Co., Ltd., Shenzhen, Guangdong Province (CN); Hon Hai Precision Industry Co., Ltd., Tu-Cheng, New Taipei (TW)

( * ) Notice: Subject to any disclaimer, the term of this patent is extended or adjusted under 35 U.S.C. 154(b) by 425 days.

(21) Appl. No.: 12/567,808

(22) Filed: Sep. 28, 2009

(65) Prior Publication Data

US 2010/0086839 A1    Apr. 8, 2010

(30) Foreign Application Priority Data

Oct. 6, 2008    (CN) .......................... 2008 1 0304753

(51) Int. Cl.
*H01M 2/10* (2006.01)
*H01M 2/00* (2006.01)

(52) U.S. Cl. .......................................... 429/97; 429/163

(58) Field of Classification Search .................. None
See application file for complete search history.

(56) References Cited

U.S. PATENT DOCUMENTS

| | | | |
|---|---|---|---|
| 4,904,549 A * | 2/1990 | Goodwin et al. | 429/97 |
| 5,596,314 A * | 1/1997 | Goldstein | 340/632 |
| 5,645,954 A * | 7/1997 | Tamaru | 429/100 |
| 6,507,485 B2 * | 1/2003 | Zadesky | 361/679.55 |
| 6,574,096 B1 * | 6/2003 | Difonzo et al. | 361/679.27 |
| 6,929,878 B2 * | 8/2005 | Chen et al. | 429/100 |
| 7,313,410 B2 * | 12/2007 | Tsai | 455/550.1 |
| 7,556,882 B2 | 7/2009 | Hsu | |
| 2005/0208345 A1 * | 9/2005 | Yoon et al. | 429/7 |

* cited by examiner

*Primary Examiner* — Barbara Gilliam
*Assistant Examiner* — Jennifer Rea
(74) *Attorney, Agent, or Firm* — Altis Law Group, Inc.

(57) ABSTRACT

An electronic device includes a main body, a control switch, and a sliding block. The main body defines a cavity for receiving a battery. The main body includes a sidewall defining an opening communicating with the cavity. The sidewall further defines a through hole adjacent to the opening. The control switch is engaged in the through hole and rotatable with respect to the sidewall. The control switch includes a protruding portion. The sliding block is movable in the main body. The protruding portion presses against the sliding block and pushes a part of the sliding block into the cavity to block the battery therein when the control switch is rotated to a first position.

13 Claims, 6 Drawing Sheets

ELECTRONIC DEVICE HAVING BATTERY HOLDER

BACKGROUND

1. Technical Field

The present disclosure generally relates to electronic devices, and particularly to an electronic device having a battery holder.

2. Description of Related Art

Most electronic devices, such as portable computers, cameras, media players, can be powered by batteries and by mains power. In almost all of these devices, the batteries are housed in a compartment within the electronic devices. When the batteries are being replaced, the battery cover is snapped off and the old batteries are removed. The new batteries are inserted and the cover replaced to hold the new batteries in place. However, replacing batteries in this manner is an inconvenience because the battery cover must be removed first, then a force is applied against the battery to remove the battery from the battery holder.

Therefore, an electronic device having an improved battery holder with facility of battery extraction is needed in the industry to address the aforementioned deficiency.

DETAILED DESCRIPTION

Figure 1:
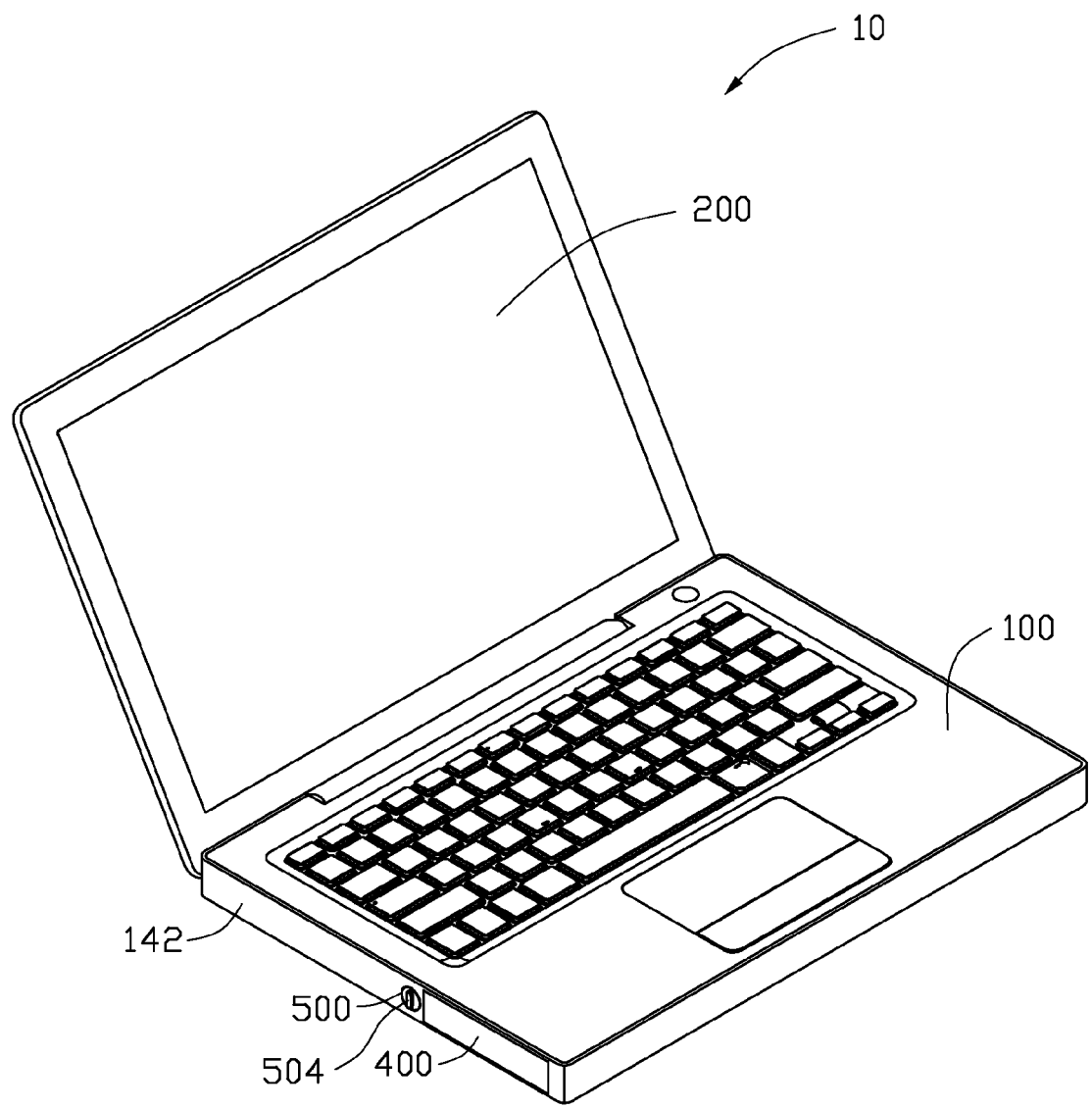
FIG. 1 is an assembled, isometric view of an electronic device in accordance with an exemplary embodiment, the electronic device includes a cover body.
Figure 2:
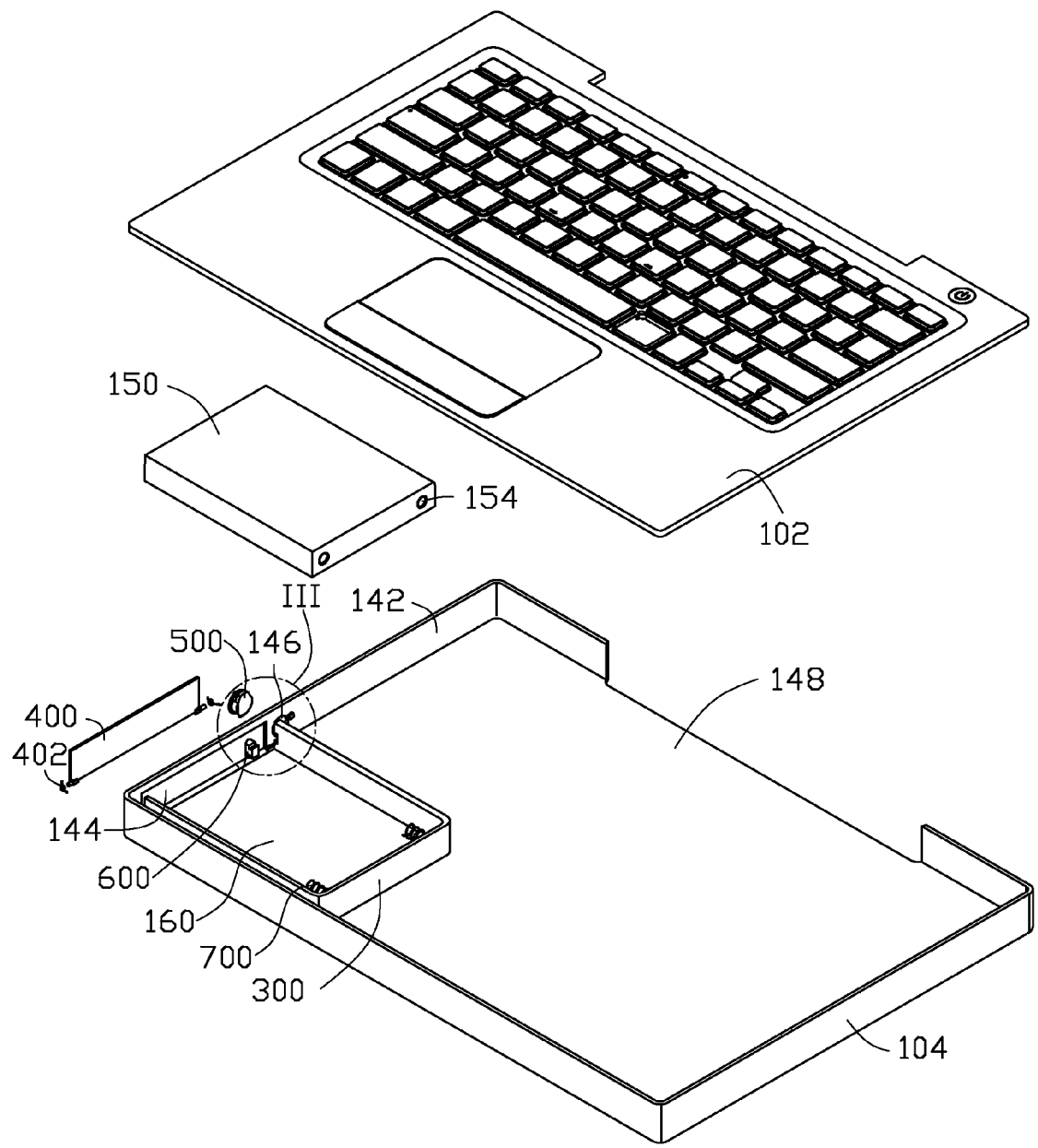
FIG. 2 is an enlarged, exploded, and isometric view of the electronic device of FIG. 1 without the cover body, the electronic device further includes a lower portion.

Referring to FIGS. 1-2, an electronic device 10 in accordance with an exemplary embodiment is illustrated. In the embodiment, the electronic device 10 is a portable computer (notebook computer). In other embodiments, the electronic device 10 may be a camera, a media player, a mobile phone, etc. The electronic device 10 includes a main body 100 and a cover 200 pivotally mounted to the main body 100. The cover 200 includes a liquid crystal display (LCD, not labeled) for displaying images.

The main body 100 includes an upper portion 102 and a lower portion 104. The upper portion 102 includes a plurality of keys for inputting instructions or information. The upper portion 102 is attached to the lower portion 104 to form a space for receiving a processing module (not shown), and a battery 150 therein. The battery 150 is used for powering the processing module and the LCD. Two recesses 154 are defined in a front side of the battery 150. Two electrodes (not shown) are respectively disposed in the two recesses 154. A cutout 152 (see FIG. 5) is further defined in a corner of the battery 150. The corner is defined by a rear side and a right side of the battery 150.

The lower portion 104 includes a sidewall 142 defining an opening 144 for the battery 150 passing therethrough, and a through hole 146 adjacent to the opening 144. A battery cover 400 is pivotally attached to the sidewall 142 via two torsion springs 402. In normal states, the battery cover 400 covers the opening 144. When the battery cover 400 is opened, the two torsion springs 402 deform storing elastic energy, and the battery 150 can be inserted into or removed from the main body 100. The battery cover 400 regains its original position to cover the opening 144 when it is released and the two torsion springs 402 then release their stored elastic energy.

A U-shaped shelf 300 is fixed to a base plate 148 of the lower portion 104. Two extreme edges of the U-shaped shelf 300 are substantially attached to the sidewall 142, so that a hatch of the U-shaped shelf 300 faces the opening 144. Two posts 702, corresponding to the two recesses 154 of the battery 150, protrude inwardly from the inner surface of a middle part 304 of the U-shaped shelf 300 (see FIG. 5). The two posts 702 are configured for electrically connecting to the two electrodes of the battery 150. Two springs 700 are respectively sleeved on the two posts 702. The base plate 148 and the sidewall 142 of the lower portion 104, the battery cover 400, the U-shaped shelf 300, and the upper portion 102 together define a cavity 160 and form a battery holder for receiving the battery 150.

Figure 3:
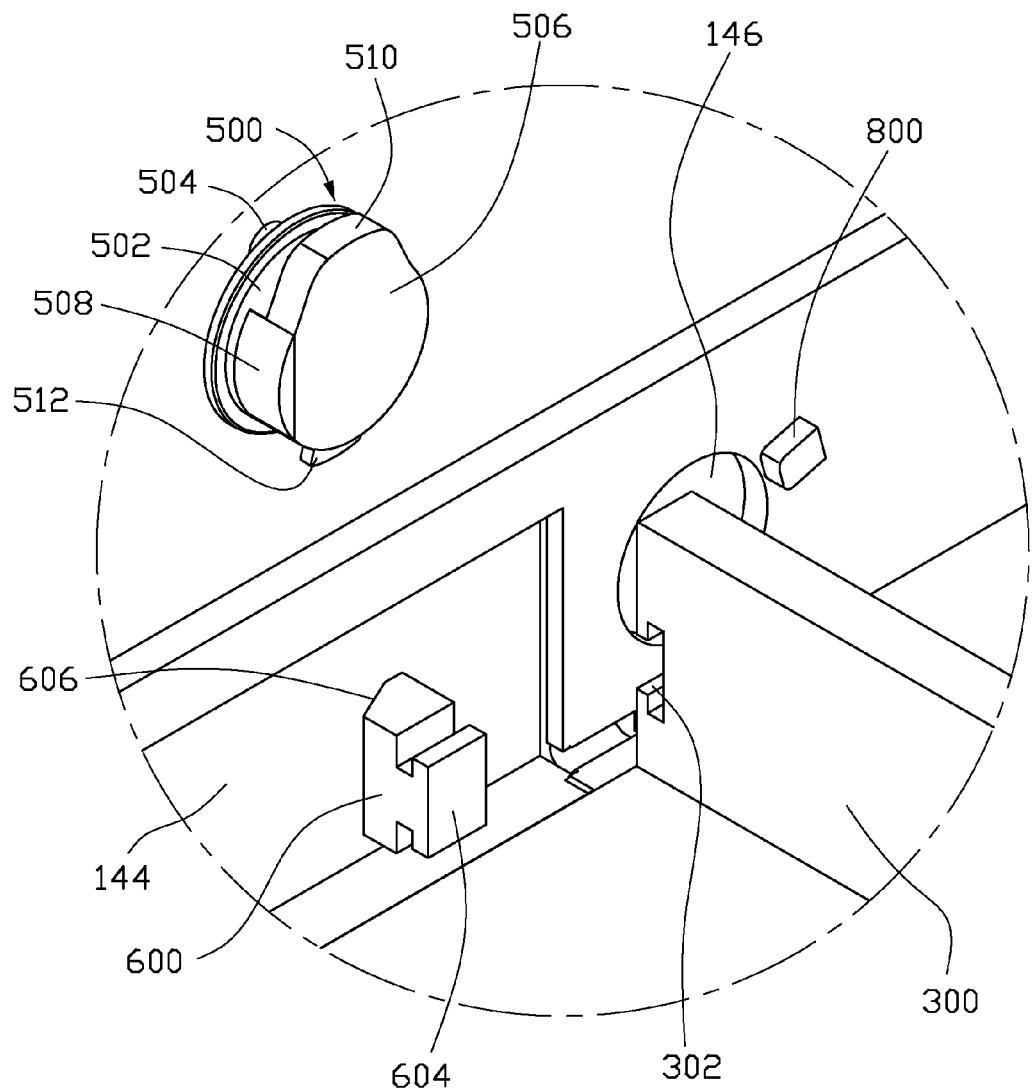
FIG. 3 is an enlarged view of a circled portion III of FIG. 2.

Referring also to FIG. 3, one of the extreme edges, adjacent to the through hole 146, of the U-shaped shelf 300 defines a T-shaped groove 302 for receiving a sliding block 600. The sliding block 600 includes a T-shaped portion 604 capable of sliding/moving in the groove 302, and a wedged portion 606 formed at an angle to the sidewall 142. The wedged portion 606 facilitates the entrance of the sliding block 600 into the cavity 160. In the embodiment, the sliding block 600 is made of magnetic material. In other embodiments, only a portion, such as the wedged portion 606, of the sliding block 600 is made of magnetic material.

The electronic device 10 further includes a control switch 500 rotatably engaged in the through hole 146, and a clamping block 800 protruding inwardly from an inner surface of the sidewall 142. The clamping block 800 is adjacent to the through hole 146, and is configured for limiting rotation of the control switch 500.

The control switch 500 includes a column 502, an operation portion 504, and an acting portion 506. The operation portion 504 includes a tray having a handle disposed thereon. The column 502 connects the operation portion 504 and the acting portion 506. A diameter of the column 502 is equal to or slightly smaller than that of the through hole 146, thus, the column 502 is capable of being received in the through hole 146. The tray of the operation portion 504 has a diameter larger than that of the through hole 146. The acting portion 506 has a substantially round shape, and has a diameter larger than that of the through hole 146.

The acting portion 506 includes a magnetic portion 508, an arced protruding portion 510, and a substantially rectangular projection 512. The protruding portion 510 and the projection 512 protrude from opposite sides of the acting portion 506. The magnetic portion 508 is disposed between the protruding portion 510 and the projection 512, along the edge of the acting portion 506. When the control switch 500 is rotated to a first position (may be labeled as "LOCK"), at which point the protruding portion 510 faces the groove 302 and presses against the sliding block 600, a part of the sliding block 600 is pushed into the cavity 160. When the control switch 500 is rotated to a second position (may be labeled as "UNLOCK"), at which point the magnetic portion 508 faces the groove 302, the sliding block 600 is attracted to slide out of the cavity 160 by the magnetic force between the sliding block 600 and the magnetic portion 508.

Figure 6:
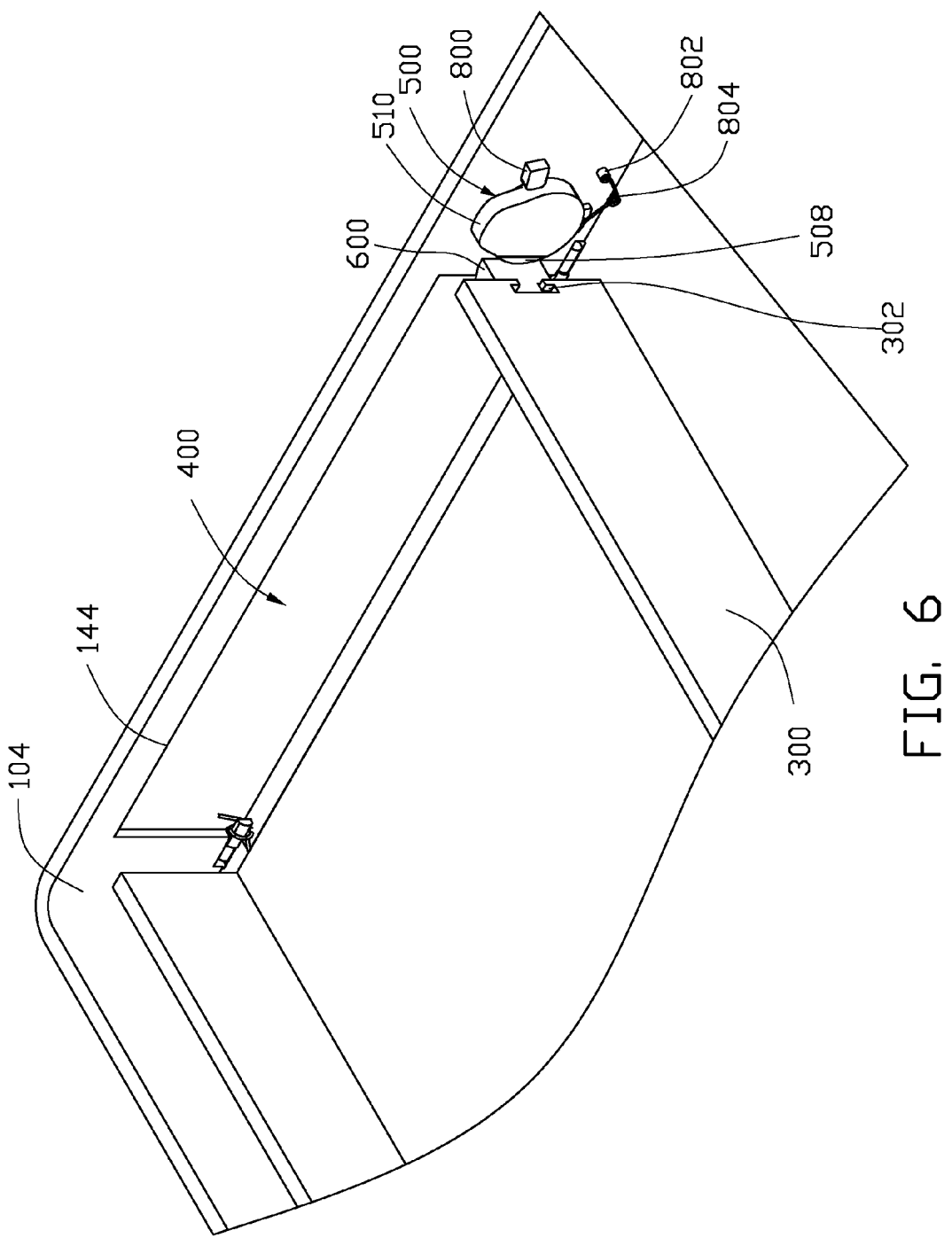
FIG. 6 is similar to FIG. 4 showing the control switch in an unlocked state.

Referring also to FIG. 6, the electronic device 10 further includes a pole 802 protruding inwardly from the inner surface of the sidewall 142, and a torsion spring 804 with an end connected to the pole 802. The other end of the torsion spring 804 is connected to the projection 512 of the control switch 500. The torsion spring 804 is configured for limiting the control switch 500 at the first position. When the control switch 500 is rotated away from the first position, the torsion spring 804 is elastically deformed to generate a pulling force on the control switch 500. Thus, the control switch 500 is capable of returning to the first position once the control switch 500 is released.

Figure 4:
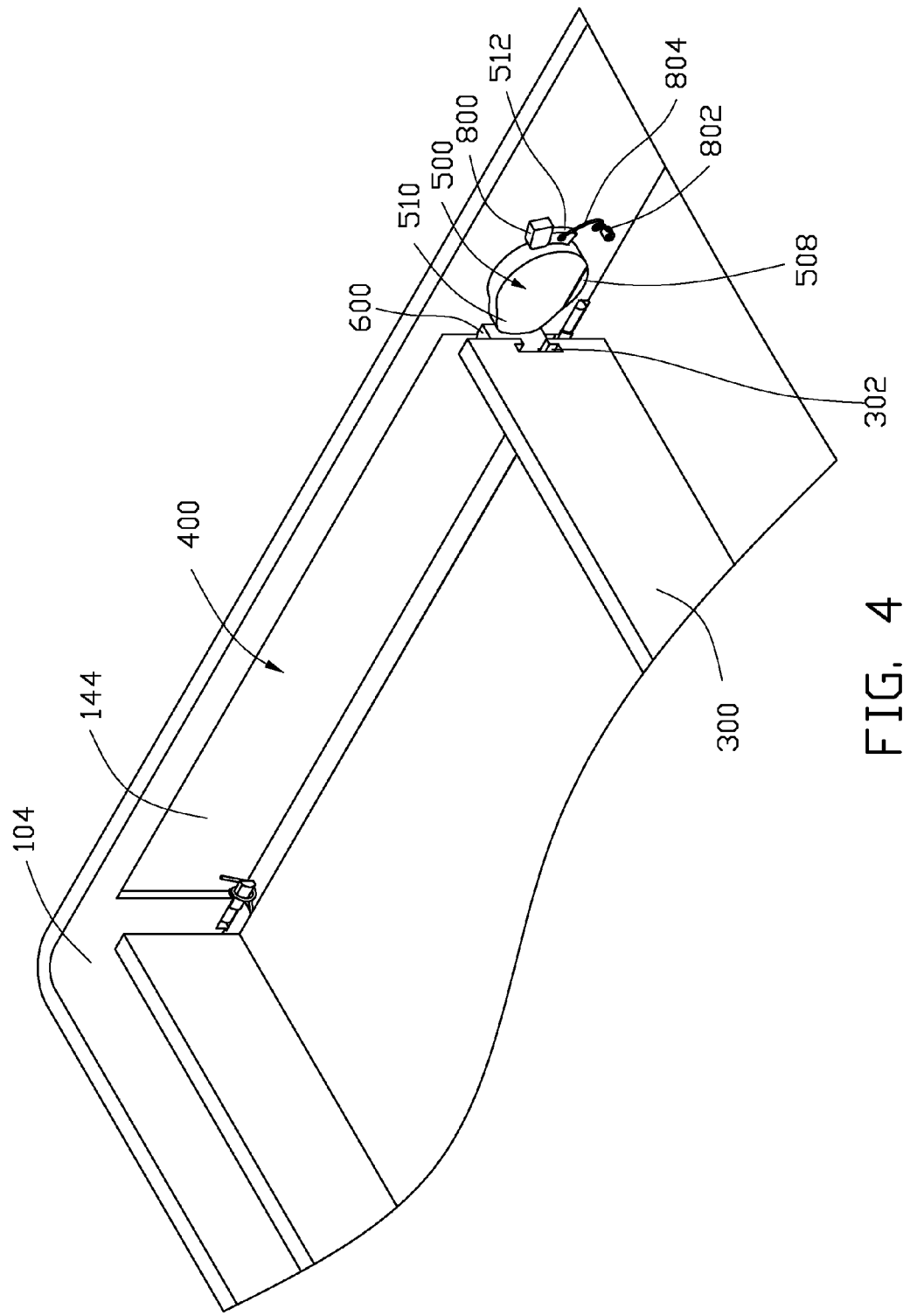
FIG. 4 is a schematic view of a part of the lower portion of FIG. 2, the part of the lower portion includes a control switch, the control switch shown in a locked state.
Figure 5:
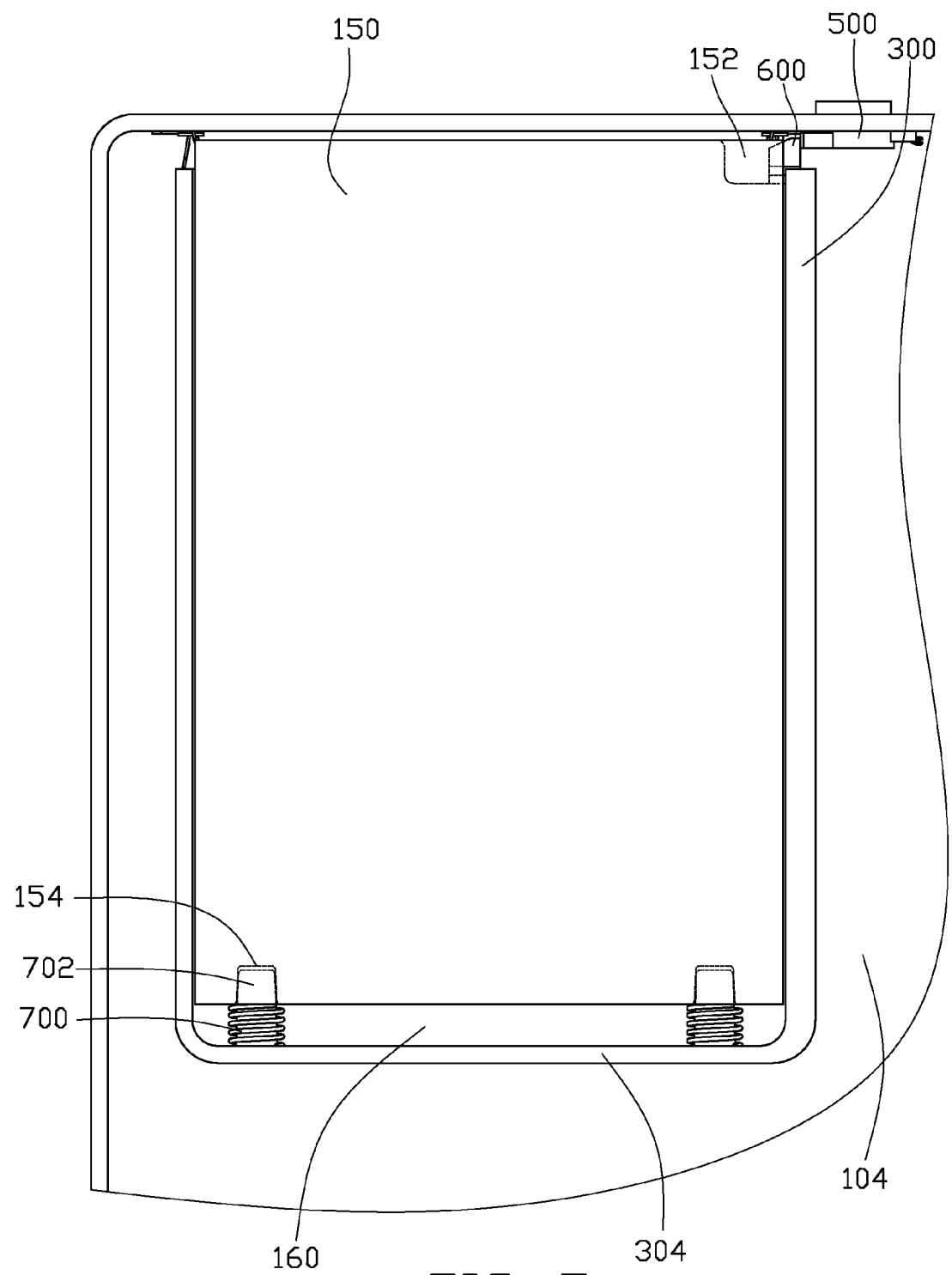
FIG. 5 is a schematic view of a part of the lower portion of FIG. 2 with a battery disposed therein.

Referring also to FIGS. 4-5, to install the battery 150, the battery cover 400 is opened firstly, then the battery 150 is inserted into the cavity 160 through the opening 144. The battery 150 is then pressed against the springs 700, thus the springs 700 become elastically deformed and store elastic energy. Next, the control switch 500 is rotated to the first position, at which point the protruding portion 510 faces the groove 302 and presses against the sliding block 600. As a result, a part of the sliding block 600 is pushed into the cavity 160, and received in the cutout 152 of the battery 150. Accordingly, the battery 150 is immovably placed in the cavity 160. The projection 512 is then pressing against the clamping block 800, thus further rotation of the control switch 500 is limited. The installation of the battery 150 ends when the battery cover 400 is closed. Thus, it is very convenient to install the battery 150 into the electronic device 10.

To remove the battery 150, the control switch 500 is rotated to the second position, at which point the magnetic portion 508 faces the sliding block 600. The sliding block 600 is attracted by the magnetic force between the sliding block 600 and the magnetic portion 508 to slide out of the cavity 160 and the cutout 152. As a result, the battery 150 is pushed out of the cavity 160 by the stored elastic energy of the springs 700. Finally, the control switch 500 may be released to return to the first position, and the battery cover 400 is closed automatically. Thus, it is very convenient to remove the battery 150 out of the electronic device 10.

It is to be understood, however, that even though numerous characteristics and advantages of the present disclosure have been set forth in the foregoing description, together with details of the structure and function of the disclosure, the disclosure is illustrative only, and changes may be made in detail, especially in matters of shape, size, and arrangement of parts within the principles of the disclosure to the full extent indicated by the broad general meaning of the terms in which the appended claims are expressed.

What is claimed is:

1. An electronic device capable of being powered by a battery, the electronic device comprising:
   a main body defining a cavity for receiving the battery, the main body comprising a sidewall defining an opening communicating with the cavity, the sidewall further defining a through hole adjacent to the opening;
   a control switch engaged in the through hole and rotatable with respect to the sidewall, the control switch comprising a protruding portion and a magnetic portion; and
   a sliding block movable in the main body, wherein at least a part of the sliding block is made of magnetic material;
   wherein when the battery is installed in the cavity through the opening, the control switch is rotated to a first position, such that the protruding portion presses against the sliding block and pushes a part of the sliding block into the cavity to block the battery therein, and the magnetic portion attracts the sliding block out of the cavity when the control switch is rotated to a second position at which point the magnetic portion faces the sliding block.

2. The electronic device of claim 1, wherein the control switch further comprises a substantially rectangular projection, the protruding portion and the projection protrude from opposite sides of the control switch.

3. The electronic device of claim 1, further comprising a clamping block protruding inwardly from an inner surface of the sidewall, the clamping block being adjacent to the through hole, and being configured for blocking the protruding portion, thus limiting a rotation of the control switch when the control switch is rotated to the first position.

4. The electronic device of claim 1, further comprising a U-shaped shelf fixed to a base plate of the main body, wherein a hatch of the U-shaped shelf faces the opening in the sidewall, and the base plate and the sidewall of the main body, the U-shaped shelf, and an upper portion of the main body together define the cavity.

5. The electronic device of claim 4, further comprising two posts protruding inwardly from the inner surface of a middle part of the U-shaped shelf, the two posts being configured for electrically connecting with electrodes of the battery.

6. The electronic device of claim 5, further comprising two springs sleeved on the two posts respectively, wherein the two springs are elastically deformed when the battery is blocked in the cavity by the sliding block, and the springs are released to push the battery out of the cavity when the sliding block slides out of the cavity.

7. The electronic device of claim 4, wherein the U-shaped shelf defines a T-shaped groove for receiving the sliding block.

8. The electronic device of claim 7, wherein the sliding block comprises a T-shaped portion capable of sliding in the groove, and a wedged portion formed at an angle to the sidewall, and the wedged portion facilitates the entrance of the sliding block into the cavity.

9. The electronic device of claim 2, further comprising a pole protruding inwardly from an inner surface of the sidewall, and a torsion spring with an end connected to the pole, wherein the other end of the torsion spring is connected to the projection of the control switch, and the torsion spring is configured for limiting the control switch at the first position.

10. An electronic device capable of being powered by a battery, the electronic device comprising:
    a sidewall defining an opening and a through hole adjacent to the opening;
    a battery holder defining a cavity communicating with the opening, and a groove communicating with the cavity;
    a control switch engaged in the through hole and rotatable with respect to the sidewall, the control switch comprising a protruding portion and a magnetic portion; and
    a sliding block movable in the groove, wherein at least a part of the sliding block is made of magnetic material;
    wherein the protruding portion presses against the sliding block and pushes a part of the sliding block into the cavity to block the battery therein when the control switch is rotated to a first position and the magnetic portion attracts the sliding block out of the cavity when the control switch is rotated to a second position at which point the magnetic portion faces the sliding block.

11. The electronic device of claim 10, wherein the control switch further comprises a substantially rectangular projection, and the protruding portion and the projection protrude from opposite sides of the control switch.

12. The electronic device of claim 11, further comprising a pole protruding inwardly from an inner surface of the sidewall, and a torsion spring with an end connected to the pole;

wherein the other end of the torsion spring is connected to the projection of the control switch, and the torsion spring is configured for limiting the control switch at the first position.

13. The electronic device of claim 10, further comprising a clamping block protruding inwardly from an inner surface of the sidewall, wherein the clamping block is adjacent to the through hole, and is configured for blocking the protruding portion thus limiting a rotation of the control switch when the control switch is rotated to the first position.

* * * * *